(12) United States Patent
Sudduth et al.

(10) Patent No.: US 6,372,172 B1
(45) Date of Patent: *Apr. 16, 2002

(54) NONWOVEN WEBS HAVING IMPROVED SOFTNESS AND BARRIER PROPERTIES

(75) Inventors: Gregory Todd Sudduth, Cumming; John Joseph Sayovitz, Marietta; Jay Sheldon Shultz, Roswell, all of GA (US)

(73) Assignee: Kimberly-Clark Worldwide, Inc., Neenah, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/994,668

(22) Filed: Dec. 19, 1997

(51) Int. Cl.$^7$ .............................. D04H 1/56; D04H 13/00
(52) U.S. Cl. .................. 264/289.3; 264/115; 264/122; 264/288.4; 264/291; 428/198; 442/400; 442/401; 442/402
(58) Field of Search ................................ 442/361, 392, 442/398, 401, 402, 382, 400; 428/198; 264/115, 122, 288.4, 291, 289.3

(56) References Cited

U.S. PATENT DOCUMENTS

| | | | |
|---|---|---|---|
| 3,802,817 A | 4/1974 | Matsuki et al. | 425/66 |
| 3,949,128 A | 4/1976 | Ostermeier | 428/153 |
| 4,041,203 A | 8/1977 | Brock et al. | 428/157 |
| 4,088,731 A | 5/1978 | Groome | 264/282 |
| 4,307,143 A | 12/1981 | Meitner | 15/104.93 |
| 4,443,513 A | 4/1984 | Meitner et al. | 428/195 |
| 4,517,714 A | 5/1985 | Sneed et al. | 28/103 |
| 5,108,820 A | 4/1992 | Kaneko et al. | 428/198 |
| 5,108,827 A | 4/1992 | Gessner | 428/219 |
| 5,272,236 A | 12/1993 | Lai et al. | 526/348.5 |
| 5,322,728 A | 6/1994 | Davey et al. | 442/401 |
| 5,336,552 A | 8/1994 | Strack et al. | 442/361 |
| 5,382,400 A | 1/1995 | Pike et al. | 264/168 |
| 5,413,811 A | 5/1995 | Fitting et al. | 427/176 |
| 5,482,765 A | 1/1996 | Bradley et al. | 428/286 |
| 5,492,751 A | 2/1996 | Butt, Sr. et al. | 428/198 |
| 5,571,619 A | 11/1996 | McAlpin et al. | 428/364 |

FOREIGN PATENT DOCUMENTS

| | | | |
|---|---|---|---|
| EP | 586924 | 3/1994 | |
| EP | 602 613 | 6/1994 | D04H/1/56 |
| WO | 97/30843 | 8/1997 | B32B/5/26 |

OTHER PUBLICATIONS

Manson, John A. and Sperling, Leslie H., *Polymer Blends and Composites*, Plenum Press, New York, NY, 1976, pp. 273–277.

*Primary Examiner*—Blaine Copenheaver
*Assistant Examiner*—John J. Guarriello
(74) *Attorney, Agent, or Firm*—Pauley Peterson Kinne & Erickson

(57) ABSTRACT

A nonwoven material including at least a meltblown web is stretched by about 1–35% in at least one direction using a short-distance drawing process, to provide a fabric having improved softness and liquid barrier compared to otherwise similar fabrics prepared using longer drawing distances. The drawing process may include one or multiple stages. When multiple stages are employed, the fabric has adequate liquid barrier at a lower basis weight.

19 Claims, 4 Drawing Sheets

NONWOVEN WEBS HAVING IMPROVED SOFTNESS AND BARRIER PROPERTIES

FIELD OF THE INVENTION

This invention is directed to nonwoven webs having improved softness and barrier to liquid penetration. The invention is also directed to a method of preparing the nonwoven webs.

BACKGROUND OF THE INVENTION

Soft nonwoven webs of entangled fibers or filaments are known, for instance, from U.S. Pat. No. 4,443,513, issued to Meitner et al. Soft nonwoven webs, and laminates of them, are useful in applications where softness and bulk are desired attributes including wipers, garments, surgical drapes, diapers and the like. The nonwoven webs may be meltblown thermoplastic fiber webs as disclosed in U.S. Pat. No. 4,307,143, issued to Meitner. These meltblown webs can be produced by meltblowing polypropylene or another thermoplastic through a die having a row of apertures, and impinging heated air at the die exit to draw the filaments, forming microfibers which are then quenched and collected on a moving wire. The nonwoven web may also be a laminate including a meltblown web, for instance a laminate including two spunbond thermoplastic webs with a meltblown web between them. Spunbond/meltblown/spunbond web laminates are disclosed in U.S. Pat. No. 4,041,203, issued to Brock et al. Purely spunbond webs, i.e. not laminated to a meltblown web, are also known in the art.

The above-identified U.S. Pat. No. 4,443,513 discloses that the softness, bulk and drapability of nonwoven webs can be improved by proper selection of interfilament bond patterns in a nonwoven web, and/or by controlled stretching of the webs. The controlled stretching takes place under cool or room temperature. The stretching is limited to the elongation required to break the web. The disclosed thermoplastic non-elastic webs can be stretched to about 1.2–1.4 times their original length.

While spunbond webs promote strength, meltblown webs are known to provide barrier to penetration by liquids, including liquids under pressure. Thus, meltblown webs, or laminates of spunbond and meltblown webs, are generally employed in applications requiring both softness and liquid barrier. There is always a need or desire for fabrics having improved liquid barrier, particularly in medical applications involving hospital and surgical gowns, and the like.

DEFINITIONS

"Nonwoven web" means a web having a structure of individual fibers or threads which are interlaid, but not in an identifiable, repeating manner. Nonwoven webs have been, in the past, formed by a variety of processes such as, for example, melt-blowing processes, spunbonding processes and bonded carded web processes.

"Autogenous bonding" means bonding provided by fusion and/or self-adhesion of fibers and/or filaments without an applied external adhesive or bonding agent. Autogenous bonding may be provided by contact between fibers and/or filaments while at least a portion of the fibers and/or filaments are semi-molten or tacky. Autogenous bonding may also be provided by blending a tackifying resin with the thermoplastic polymers used to form the fibers and/or filaments. Fibers and/or filaments formed from such a blend can be adapted to self-bond with or without the application of pressure and/or heat. Solvents may also be used to cause fusion of fibers and filaments which remains after the solvent is removed.

"Meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, possibly to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin, the disclosure of which is hereby incorporated by reference.

"Spunbonded fibers" refers to small diameter fibers which are formed by extruding a molten thermoplastic material as filaments from a plurality of fine, usually circular, capillaries of a spinnerette with the diameter of the extruded filaments then being rapidly reduced as by, for example, eductive drawing or other well-known spunbonding mechanisms. The production of spunbonded nonwoven webs is illustrated in patents such as, for example, in U.S. Pat. No. 3,802,817 to Matsuki et al. and U.S. Pat. No. 5,382,400 to Pike et al. The disclosures of these patents are hereby incorporated by reference.

"Polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

"Bicomponent fibers" refers to fibers which have been formed from at least two polymers extruded from separate extruders but spun together to form one fiber. The polymers are arranged in substantially constantly positioned distinct zones across the cross-section of the bicomponent fibers and extend continuously along the length of the bicomponent fibers. The configuration of such a bicomponent fiber may be, for example, a sheath/core arrangement wherein one polymer is surrounded by another or may be a side-by-side arrangement or an "islands-in-the-sea" arrangement. Bicomponent fibers are taught in U.S. Pat. No. 5,108,820 to Kaneko et al., U.S. Pat. No. 5,336,552 to Strack et al., and European Patent 0586924. For two component fibers, the polymers may be present in ratios of 75/25, 50/50, 2/75 or any other desired ratios.

"Biconstituent fibers" refers to fibers which have been formed from at least two polymers extruded from the same extruder as a blend. The term "blend" is defined below. Biconstituent fibers do not have the various polymer components arranged in relatively constantly positioned distinct zones across the cross-sectional area of the fiber and the various polymers are usually not continuous along the entire length of the fiber, instead usually forming fibrils which start and end at random. Biconstituent fibers are sometimes also referred to as multiconstituent fibers. Fibers of this general type are discussed in, for example, U.S. Pat. No. 5,108,827 to Gessner. Bicomponent and biconstituent fibers are also discussed in the textbook *Polymer Blends and Composites* by John A. Manson and Leslie H. Sperling, copyright 1976 by Plenum Press, a division of Plenum Publishing Corporation, New York, N.Y., IBSN 0-306-30831-2, at pages 273 through 277.

"Blend" means a mixture of two or more polymers while the term "alloy" means a sub-class of blends wherein the components are immiscible but have been compatibilized. "Miscibility" and "immiscibility" are defined as blends having negative and positive values, respectively, for the free energy of mixing. Further, "compatibilization" is defined as the process of modifying the interfacial properties of an immiscible polymer blend in order to make an alloy.

"Microfibers" means small diameter fibers having an average diameter not greater than about 100 microns, for example, having an average diameter of from about 0.5 microns to about 50 microns, or more particularly, an average diameter of from about 4 microns to about 40 microns.

"Nonwoven web bond pattern" is a pattern of interfilament bonding in the nonwoven web which is imparted during manufacture of the nonwoven web.

"Interfiber bonding" means bonding produced by entanglement between individual fibers to form a coherent web structure without the use of thermal bonding. This fiber entangling is inherent in the meltblown processes but may be generated or increased by processes such as, for example, hydraulic entangling or needle punching. Alternatively and/or additionally, a bonding agent can be utilized to increase the desired bonding and to maintain structural coherency of a fibrous web. For example, powdered bonding agents and chemical solvent bonding may be used.

"Liquid pressure resistance" (also known as "hydrohead") refers to the ability of a composition or film made therefrom to withstand the application of a load of liquid without leakage. The liquid pressure resistance of a film depends on the thickness of the film, the material composition of the film, how the film is made and processed, the surrounding environment, and the method of testing. Methods of testing the liquid pressure resistance of a film or material include without limitation the Hydrostatic Pressure Test described in Method 5514 of Federal Test Methods Standard No. 191A, which is equivalent to AATCC Test Method 127-89 and INDA Test Method 80.4-92.

"Consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, particulates and materials added to enhance processability of the composition.

SUMMARY OF THE INVENTION

The present invention relates to a nonwoven web having excellent softness and improved liquid barrier (hydrohead resistance), and laminates including the nonwoven web. The invention also includes a process for making the nonwoven web.

The nonwoven web of the invention includes a meltblown web. The nonwoven web may be a single layer (meltblown) nonwoven web, or may be a laminate of a meltblown web to one or more additional nonwoven webs. The additional nonwoven webs may be additional meltblown webs, spunbond webs, bonded carded webs, or any web or webs that can be used advantageously in combination with the meltblown web. The meltblown web, with or without another nonwoven web, can also be combined with a plastic film, foam, or other entity.

The nonwoven web is heated and stretched between two or more pairs of draw rollers. It has been discovered that the draw rollers can be configured so that the stretching causes the nonwoven web to have improved hydrohead strength as well as softness. Specifically, the drawing distance (i.e. the distance over which the nonwoven web is drawn between two adjacent pairs of draw rollers) is maintained at less than about 35 inches for a single-stage drawing process including only two pairs of adjacent draw rollers, while the heated nonwoven web is stretched by about 1% to about 35% of its initial length. Ideally, the drawing distance is maintained at less than 10 inches while the heated nonwoven web is stretched by about 1% to about 35% of its initial length.

In another embodiment, the nonwoven web is drawn in multiple stages using three or more pairs of draw rollers. When multiple stages are employed, the total drawing distance (i.e., the sum of the distance between adjacent pairs of draw rollers) is maintained at less than about 35 inches while the nonwoven web is stretched by about 1% to about 35% of its original length. One major advantage of using a multi-stage drawing process (as opposed to a single-stage draw) is that the product has a lower basis weight following the drawing, allowing a comparable product to be obtained having greater area with adequate liquid barrier and softness.

Other advantages of short distance drawing, whether single-stage or multi-stage, are reduced neck-in of the nonwoven webs during stretching, increased cup crush strength, and increased tensile strength.

The foregoing and other features and advantages of the invention will become further apparent from the following detailed description of the presently preferred embodiments, read in conjunction with the accompanying examples and drawings. The detailed description, examples and drawings are intended to be illustrative of the invention rather than limiting, the scope of the invention being defined by the appended claims and equivalents thereof.

DETAILED DESCRIPTION OF THE PRESENTLY PREFERRED EMBODIMENTS

Figure 1:
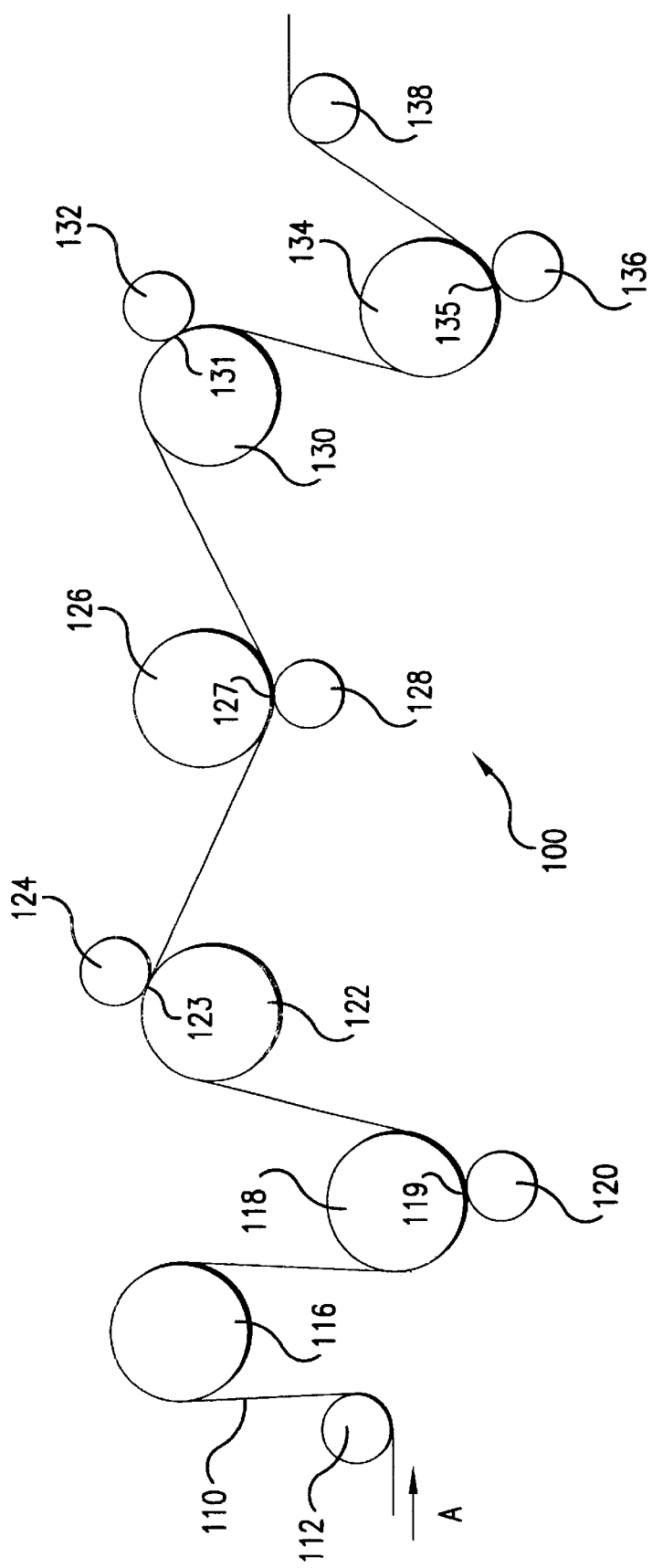
FIG. 1 illustrates an apparatus which can be operated as a single-stage or multi-stage drawing unit useful for preparing a nonwoven web according to the invention.

FIG. 1 illustrates an apparatus 100 which can be used for single-stage or multiple-stage stretching of a nonwoven web. A nonwoven web 110 travels along a path indicated by the arrow A around guide roll 112, guide roll 116, and through a junction 119 between a first pair of nip rolls 118 and 120. Then, the web 110 passes through a junction 123 between a second pair of nip rolls 122 and 124, through a junction 127 between a third pair of nip rolls 126 and 128, through a junction 131 between a fourth pair of nip rollers 130 and 132, through a junction 135 between a fifth pair of nip rollers 134 and 136, and around guide roll 138.

The apparatus 100 is capable of various modes of operation, and the following is merely illustrative of practical embodiments. The various rolls may be fabricated from a metal such as aluminum or steel, from a hard rubber, or from various hard or slightly resilient materials. Where two rolls (e.g. 122 and 124) are adjacent to form a nip, one of the rolls (e.g. the large roll 122) may be of metal, while the other roll (e.g. the small roll 124) may be of a hard but slightly resilient material. This allows slight application of a small pressure at the nip junction 123 without causing undue deformation of the nonwoven web. The other pairs of nip rolls may be similarly configured. Also, the distance between adjacent nip junctions may be adjusted. For instance, the distance between nip junctions 119 and 123 may be adjusted by placing the nip rolls 122 and 124 closer to, or further away, from the nip rollers 118 and 120.

For single-stage drawing, the web 110 may be preheated by heating the rollers 116 and 118. Alternatively, the web may be drawn without added heat. For heated drawing, the rolls 116 and 118 may be heated to a temperature that is above room temperature and below the temperature where the polymer in the web softens and sticks to the rolls. For a polypropylene-based web, roll temperatures of about 150–250° F. are preferred. The advantage of heating is that it permits somewhat greater and/or faster stretching of the web without causing breakage.

The second pair of nip rolls 122 and 124, and the third pair of nip rolls 126 and 128, may be used to effect the single-stage draw of the web 110. For heated drawing, the larger rolls 122 and 126 should also be heated to the desired draw temperature, e.g., about 150–225° F. for a polypropylene web. The drawing is effected by simply rotating the third pair of nip rolls 126 and 128 at a higher surface velocity than the second pair of nip rolls 122 and 124. For instance, a stretch of 20% can be achieved by causing the web to pass through the third nip junction 127, at a 20% faster speed than it passes through the second nip junction 123. As explained above, the draw distance may be varied by varying the traveling distance of the nonwoven web 110 between the two nip junctions 123 and 127.

The term "draw distance" for a single stage draw refers to the distance the nonwoven web travels between the two adjacent pairs of nip rolls used for drawing, not including the distance over which the web is in direct contact with any roll. This is the distance over which the web may be drawn. The single-stage draw may be effected between any two adjacent nip junctions in the apparatus 100, by creating an increased web travel speed through the downstream nip junction compared to the upstream nip junction. For a single-stage draw, the velocities of the nip rolls not used to effect the draw are adjusted so as not to affect the length of the web.

Multi-stage drawing differs from single-stage drawing in that more than two pairs of nip rolls, and more than two nip junctions, are used to effect the draw. For example, a three-stage drawing of the web 110 may be effected using the second pair of nip rolls 122 and 124, the third pair of nip rolls 126 and 128, the fourth pair of nip rolls 130 and 132, and the fifth pair of nip rolls 134 and 136. To effect the three-stage draw, nip rolls 126 and 128 turn at a higher surface velocity than nip rolls 122 and 124. Nip rolls 130 and 132 turn at a higher surface velocity than nip rolls 126 and 128. Nip rolls 134 and 136 turn at a faster surface speed than nip rolls 130 and 132.

The term "draw distance" for a multi-stage draw refers to the sum of the distances over which the nonwoven web is drawn in the various stages. For instance, a web which is drawn over lengths of six inches in each of three stages, is exposed to a total draw distance of eighteen inches.

The present invention is a stretched nonwoven web prepared using a total draw distance of not more than about 35 inches, preferably less than about 25 inches, more preferably not more than about 10 inches, and most preferably not more than about 6 inches. The nonwoven web is stretched by about 1–35% of its initial length, preferably by about 3–20% of its initial length, most preferably by about 4–15% of its initial length. The stretching using the short-distance draw causes the web to have improved softness while maintaining higher hydrohead resistance and strength, lower neck-in and other desirable properties, compared to a similar nonwoven web prepared using a longer draw distance.

The nonwoven web should include a meltblown web. Meltblown webs, in which the individual fibers are in close contact, are useful in applications requiring hydrohead resistance and other barrier properties. The meltblown web is not limited as to basis weight. The meltblown basis weight will generally be between about 0.1–3.5 ounce/yd$^2$ (osy), more commonly between about 0.3–2.0 osy. The lower basis weight meltblown webs are preferred because of their lower costs, and are generally more practical when the meltblown web is part of a laminate.

The nonwoven web may include additional nonwoven layers. Examples of additional nonwoven layers include spunbond webs, staple fiber webs, bonded carded webs, and the like. In a preferred embodiment, two outer spunbond webs are combined with an inner meltblown web to create a spunbond/meltblown/spunbond (SMS) web combination. SMS web laminates have a wide variety of advantages which are discussed in the above-mentioned U.S. Pat. No. 4,041,203, issued to Brock et al. The nonwoven web may also be laminated to a polyolefin film or foam, or another substrate.

The meltblown web, and other nonwoven web layers, may be constructed from the same or different materials. A wide variety of thermoplastic materials are useful in forming the nonwoven web layers including, without limitation, polyethylene, polypropylene, polyamides, polyesters, copolymers of mainly ethylene and $C_3$–$C_{12}$ alpha-olefins (commonly known as linear low density polyethylene), copolymers of mainly propylene with ethylene and/or $C_4$–$C_2$ alpha-olefins, and flexible polyolefins including propylene-based polymers having both atactic and isotactic propylene groups in the main polypropylene chain. Other suitable polymers include without limitation elastomers, for example polyurethanes, copolyether esters, polyamide polyether block copolymers, ethylene vinyl acetate copolymers, polyacrylates, ethylene alkyl acrylates, polyisobutylene, polybutadiene, isobutylene-isoprene copolymers, block copolymers having the general formula A-B-A' or A–B such as copoly (styrene/ethylene-butylene), styrene-poly (ethylene-propylene)-styrene, styrene-poly (ethylene-butylene)-styrene, polystyrene/poly-(ethylene-butylene)/polystyrene, poly(styrene/ethylene-butylene/styrene), and the like. Constrained geometry and/or metallocene-catalyzed polyolefins are also useful, including those described in U.S. Pat. Nos. 5,571,619; 5,322,728; and 5,272,236, the disclosures of which are incorporated herein by reference.

Polymers made using constrained geometry and/or metallocene catalysts have a very narrow molecular weight range. Polydispersity numbers (Mw/Mn) of below 4 and even below 3 are possible for constrained geometry and/or metallocene-produced polymers. These polymers also have a controlled short chain branching distribution compared to otherwise similar Ziegler-Natta produced type polymers. It is also possible using a constrained geometry and/or metallocene catalyst system to control the isotacticity of the polymer quite closely.

In a preferred embodiment, the nonwoven web is stretched using a multi-stage process. It has been discovered that when nonwoven webs are stretched over a short total drawing distance as described herein, certain advantages result from performing the total drawing using a series of smaller drawing steps. One advantage is that there is a lower basis weight product when the web is drawn using a series of smaller steps. This results in cost savings, due to less neck-in of the web at the lower basis weight, and greater product area.

It is important that the same desirable properties of softness and liquid barrier can be achieved using a lower basis weight starting material, when the nonwoven web is stretched using multiple stages. Preferably, the web is stretched in two or more stages. More preferably, the web is stretched in three or more stages.

The percentage of total stretching, and the total drawing distance, may be about the same regardless of whether single-stage or multi-stage drawing is employed. Thus, the preferred ranges given above for percent stretch and total drawing distance are applicable for single-stage and multi-stage processes. When a multi-stage process is employed, it is preferred, though not necessary, that the stages be equal. For instance, a total drawing distance of 7.5 inches may be accomplished in three equal stages of 2.5 inches to achieve the optimal improvements in physical properties.

TEST PROCEDURES

The following test procedures were employed in connection with the Examples discussed below.

Hydrostatic Pressure Test (Hydrohead)

The hydrohead resistance was measured according to Method 5514 of Federal Test Methods Standard No. 191A, which is equivalent to AATCC Test Method 127-89 and INDA Test Method 80.4-92. These test methods are incorporated herein by reference.

Cupcrush Test (Softness)

This test is used to determine the detectable softness of a nonwoven material by using the peak load and energy units from a Sintech Tensile Machine at a constant rate of extension (CRE). A CRE machine is a testing machine in which the rate of increase in the specimen length is uniform with time. A nonwoven material sample is formed inside a cup. A foot descends into the cup "crushing" the sample, and the CRE measures the peak load and energy needed to crush the material. The results are a manifestation of the stiffness of the material. The stiffer the material, the higher the peak load value.

To conduct the test, a minimum of three random samples are cut from the nonwoven web. Each sample is 225 mm wide and 225 mm long. The CRE machine is then prepared as follows:
1. Prepare the machine according to the manufacturer's instructions and using the conditions in the following steps of this section:
   1.1 Set the LOAD DIRECTION to DOWN.
   1.2 Set the EXTENSION DIRECTION to DOWN.
   1.3 Set GAGE LENGTH to 3.82±0.1 in. (97±2.5 mm). This can be accomplished by measuring from the top of the base plate to the flat top of the foot.
   1.4 Set the CROSSHEAD SPEED to 16.0±0.5 in/min (400±10 mm).
   1.5 Set STRAIN LIMIT to RETURN at 62.9%.
   1.6 Set the HIGH EXTENSION LIMIT to 2.6 in (63 mm).
   1.7 Set the ENERGY to start reading at 15 mm (0.61 in).
   1.8 Set the ENERGY to stop reading at 60 mm (2.46 in).
2. Select and install a load cell that has the proper range for the material being tested.
Note 1: These settings can be installed manually onto the Sintech equipment, or if the Sintech equipment is set up for Testworks using the DOS version. All the settings may be installed using a computer disk which may be obtained from Roswell Test Standardization.
Note 2: In the above Set-up Instructions (9.1.3 to 9.1.8) use the BOLD ITALIC numbers to set up your equipment.

The sample specimens are conditioned in a standard laboratory atmosphere of 23±2° C. and 50±15% relative humidity. Then the specimens are tested according to the following procedure:
1. Place the steel ring over the forming cylinder.
2. Center the specimen over the forming cylinder.
3. Slide the forming cup over the cylinder until the material is pinched between the cylinder and the steel ring.
4. Carefully lift up the forming cup and check that the specimen is pinched between the steel ring and the forming cylinder.
Note 3: If the specimen is not pinched between the ring and the cylinder all the way around, the specimen must be rejected.
5. Place the forming cup on top of the base plate.
Note 4: Make sure that the forming cup is firmly seated over the ridge of the base plate.
6. Start the crosshead.
7. When the test has ended remove specimen from the base plate.
8. For more specimens, repeat Steps 1–7.

The peak load is then reported in grams for each specimen. The energy is reported in grams/mm for each specimen, and the results for the multiple specimens are averaged.

Basis Weight

The basis weight is determined by measuring the mass of a nonwoven web sample, and dividing it by the area covered by the sample.

EXAMPLES

The following examples were performed with a SMS material manufactured by the Kimberly-Clark Corporation. The SMS material was a laminate of a polypropylene copolymer (3% ethylene) spunbond web, a polypropylene meltblown web (including 10% polybutylene), and another identical polypropylene copolymer spunbond web. The SMS material had an initial basis weight (before stretching) of about 1.4–1.5 osy. The material samples were stretched using either a single-stage or three-stage stretching, with an apparatus similar to the one shown in FIG. 1 and described above. The drawing temperatures ranged from about 210–220° F. The SMS material had an initial width of about 20 inches, and drawing was effected using (unwind) line speeds of about 200 feet per minute.

Comparison Of Draw Distance And Percentage Neck Down (Examples 1–3)

Using a single-stage draw, the percent neck-down was measured for three samples stretched by 7% lengthwise, using different draw distances. The following results were achieved:

| Example No. | Draw Distance, In. | % Neck Down |
|---|---|---|
| 1 | 55 | 14 |
| 2 | 20 | 9 |
| 3 | 4 | 5 |

As shown above, at constant percent linear stretching the neck down improves (is reduced) at short draw distance. Use of a 20-inch draw distance showed significantly improved neck-down compared to a 55-inch draw distance. Use of a 4-inch draw distance resulted in significant further improvement.

Comparison Of Cupcrush (Softness) And Draw Distance (Examples 4–6)

Using a single-stage draw, the cupcrush (softness) was measured for three samples stretched by 7%, using different draw distances, the following results were achieved.

| Example No. | Draw Distance, In. | Cupcrush, grams/mm |
|---|---|---|
| 4 | 55 | 2000 |
| 5 | 20 | 2100 |
| 6 | 4 | 1750 |

As shown above, the softness of the product improved for the very low draw distance, compared to the two longer draw distances.

Comparison Of Hydrohead (Liquid Barrier) With Draw Distance And Percentage Draw (Examples 7–16)

Using a single-stage draw, samples were prepared at different draw distances and different percentage draws, and were tested for hydrohead.

| Example No. | Draw Distance, Inches | % Draw | Hydrohead (mBar) |
|---|---|---|---|
| 7 | 20 | 3 | 82 |
| 8 | 4 | 3 | 92 |
| 9 | 55 | 7 | 66 |
| 10 | 20 | 7 | 73 |
| 11 | 4 | 7 | 77 |
| 12 | 55 | 10 | 59 |
| 13 | 20 | 10 | 66 |
| 14 | 4 | 10 | 82 |
| 15 | 20 | 13 | 73 |
| 16 | 4 | 13 | 90 |

Plotted as a matrix, the following relationship between draw distance, percentage draw and hydrohead is shown.

| Draw Distance (inches) | % Draw | | | |
|---|---|---|---|---|
| | 3 | 7 | 10 | 13 |
| | Hydrohead (mBar) | | | |
| 55 | | 66 | 59 | |
| 20 | 82 | 73 | 66 | 73 |
| 4 | 92 | 77 | 82 | 90 |

As shown above, for every stretching ratio tested, the hydrohead resistance became higher as the draw distance was decreased. At constant draw distance, stretching ratios below 7% and above 10% gave better hydroheads than stretching ratios of 7–10%.

Comparison Of Product Basis Weight With Draw Distance And Percentage Draw (Examples 17–27)

Using a single-stage draw, samples were prepared at different draw distances and different percentage draws, and were tested for product basis weight.

| Example No. | Draw Distance, In. | % Draw | Basis Weight, osy |
|---|---|---|---|
| 17 | 55 | 3 | 1.52 |
| 18 | 20 | 3 | 1.49 |
| 19 | 4 | 3 | 1.40 |
| 20 | 55 | 7 | 1.58 |
| 21 | 20 | 7 | 1.44 |
| 22 | 4 | 7 | 1.42 |
| 23 | 55 | 10 | 1.60 |
| 24 | 20 | 10 | 1.44 |
| 25 | 4 | 10 | 1.42 |
| 26 | 20 | 13 | 1.43 |
| 27 | 4 | 13 | 1.41 |

As shown above, the basis weights decreased somewhat as the draw distance was lowered, at every percent of draw. This is consistent with Examples 1–3 showing that higher draw distances cause greater neck-ins, i.e., greater lateral contraction. Samples with higher neck-ins would be expected to have higher basis weights, for a given percentage of draw.

However, it is surprising and unexpected that the samples with the lowest basis weights (occurring at the shortest draw distances) also tend to have the highest hydrohead resistance as shown by Examples 7–16, along with slightly improved softness as shown by Examples 4–6. Thus, for a particular stretching percentage, the use of shorter draw distances yields superior nonwoven fabric product having superior liquid barrier and softness.

It is noted that many of the above samples were tested for tensile strength. There was no noticeable change in product tensile strength at different draw distances.

comparison Of Single-Stage And Three-Stage Drawing (Examples 28–35)

Samples were prepared using single-stage and three-stage drawing, at four different draw percentages, and a single draw distance of 6 inches. For the multi-stage draw, the draw distance of 6 inches was divided into three equal stages of 2 inches each. The following table summarizes the conditions used.

| Example | No. of Stages | % Draw | % Draw Per Stage |
|---|---|---|---|
| 28 | 1 | 0 | 0 |
| 29 | 3 | 0 | 0 |
| 30 | 1 | 6 | 6 |
| 31 | 3 | 6 | 2 + 2 + 2 |
| 32 | 1 | 12 | 12 |
| 33 | 3 | 12 | 4 + 4 + 4 |
| 34 | 1 | 19 | 19 |
| 35 | 3 | 19 | 6.3 + 6.3 + 6.3 |

Figure 2:
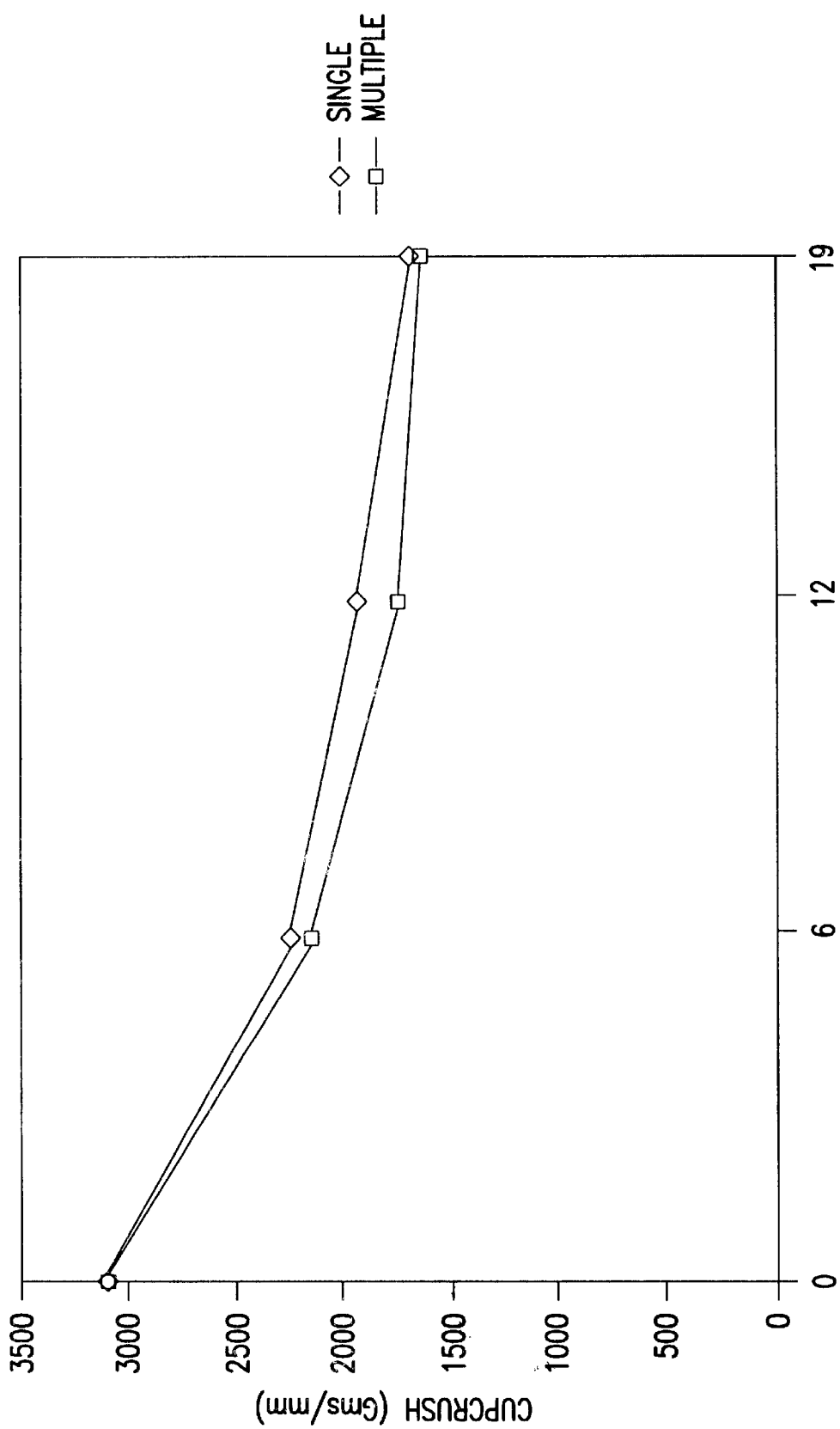
FIG. 2 shows the cupcrush softness for nonwoven samples prepared using single-stage and multi-stage drawing.

The samples were tested for softness, hydrohead and basis weight, and the result were plotted. FIG. 2 shows the softness vs. percentage draw. At every level of drawing, the samples prepared using the three-stage draw had slightly better softness, evidenced by lower cupcrush values, than the samples prepared using the single-stage draw.

Figure 3:
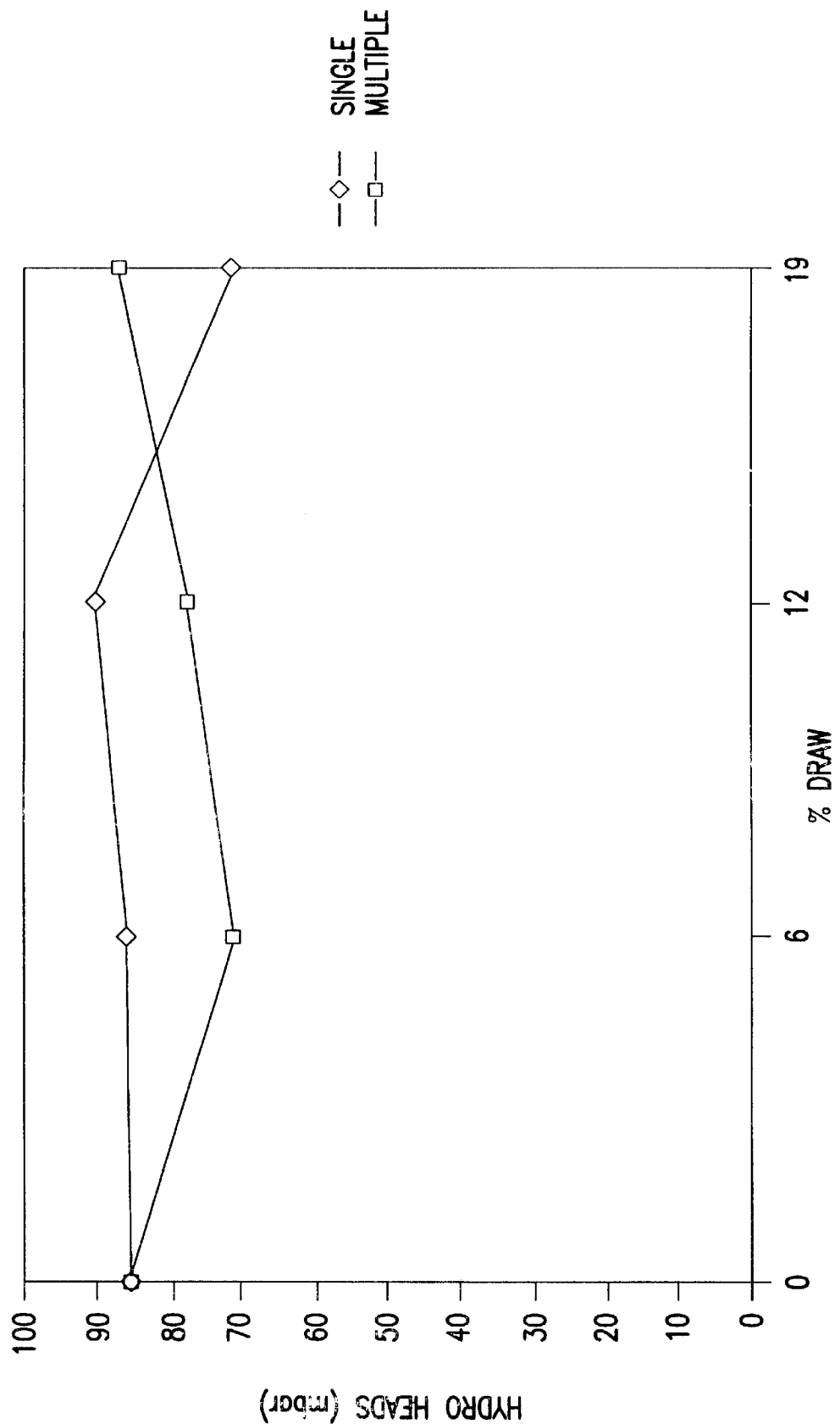
FIG. 3 shows the hydrohead values for nonwoven samples prepared using single-stage and multi-stage drawing.

FIG. 3 shows the hydrohead vs. percentage draw. At short drawing ratios of 6% and 12%, the samples prepared using the three-stage draw had somewhat lower yet adequate hydrohead values (better liquid pressure resistance) than the samples prepared using the single-stage draw. The trend was reversed at 19% draw.

Figure 4:
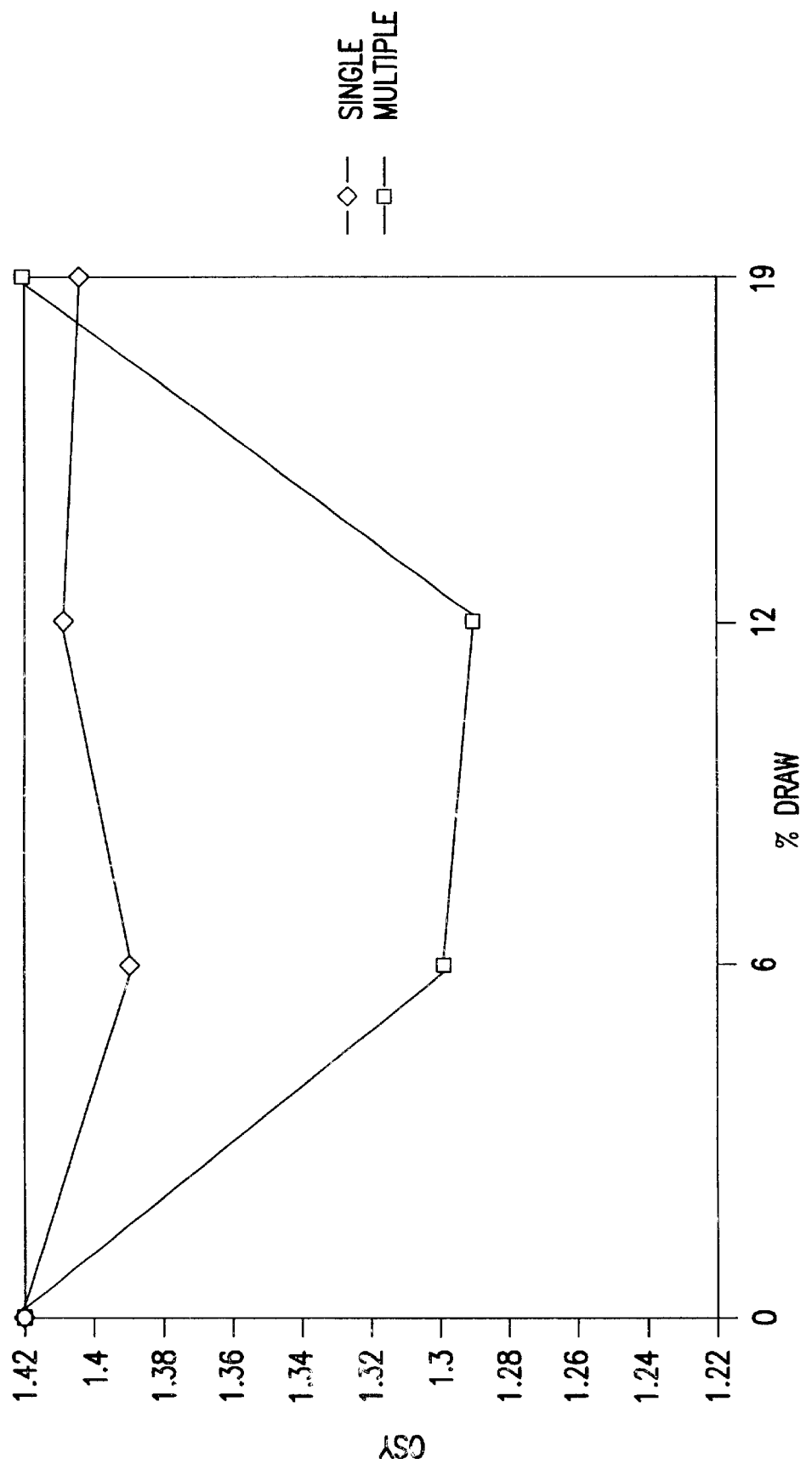
FIG. 4 shows the basis weight for nonwoven samples prepared using single-stage and multiple-stage drawing.

FIG. 4 shows the basis weight vs. percentage draw. At short drawing ratios of 6% and 12%, the samples prepared using the three-stage draw had significantly lower basis weights than the samples prepared using the single-stage draw. This advantage disappeared at 19% draw.

In summary, at draw ratios of 6% and 12% the multi-stage draw produced much improved products which exhibited a surprising combination of lower basis weight and adequate hydrohead resistance, as well as improved softness, compared to products made using the single-stage draw.

While the embodiments of the invention disclosed herein are presently considered preferred, various modifications and improvements can be made without departing from the spirit and scope of the invention. The scope of the invention is indicated in the appended claims, and all changes that fall within the range of equivalents are intended to be embraced therein.

We claim:

1. A method of preparing a softened nonwoven material having high hydrohead resistance of at least 70 mBar, comprising the steps of:

providing a nonwoven material including at least one meltblown nonwoven web layer; and stretching the nonwoven material by about 1–35% of an initial length using a multiple-stage draw using three or more pairs of nip rolls having a draw distance of not more than about 35 inches to provide the softened nonwoven material having high hydrohead resistance.

2. The method of claim 1, wherein the draw distance is not more than about 25 inches.

3. The method of claim 1, wherein the draw distance is not more than about 10 inches.

4. The method of claim 1, wherein the draw distance is not more than about 6 inches.

5. The method of claim 1, wherein the nonwoven material is stretched by about 3–20% of the initial length.

6. The method of claim 1, wherein the nonwoven material is stretched by about 4–15% of the initial length.

7. The method of claim 1, further comprising the step of heating the nonwoven material before stretching it.

8. A method of preparing a softened nonwoven material having high hydrohead resistance of at least 70 mBar, comprising the steps of:

providing a nonwoven material including at least one meltblown nonwoven web layer;

providing at least first, second, and third pairs of nip rollers;

heating at least the first pair of nip rollers; and stretching the nonwoven material between the nip rollers by about 1–35% of an initial length using a draw distance of about 1–35 inches to provide a softened nonwoven material having high hydrohead resistance.

9. The method of claim 8, wherein the draw distance is not more than about 25 inches.

10. The method of claim 8, wherein the draw distance is not more than about 10 inches.

11. The method of claim 8, wherein the draw distance is not more than about 6 inches.

12. The method of claim 8, wherein the nonwoven material is stretched by about 3–20% of the initial length.

13. The method of claim 8, wherein the nonwoven material is stretched by about 4–15% of the initial length.

14. A method of preparing a softened nonwoven web laminate having high hydrohead resistance of at least 70 mBar, comprising the steps of:

providing a nonwoven web laminate including an inner meltblown web and two outer spunbond webs; and stretching the nonwoven web laminate by about 1–35% of an initial length between at least three pairs of nip rollers, using a draw distance of not more than about 35 inches to provide the softened nonwoven web laminate having high hydrohead resistance.

15. The method of claim 14, wherein the draw distance is not more than about 25 inches.

16. The method of claim 14, wherein the draw distance is not more than about 10 inches.

17. The method of claim 14, wherein the draw distance is not more than about 6 inches.

18. The method of claim 14, wherein the spunbond and meltblown webs comprise a polyolefin.

19. The method of claim 14, wherein the spunbond and meltblown webs comprise a propylene polymer.

* * * * *